(No Model.)

L. B. NIELSEN.
CENTRIFUGAL CREAMER.

No. 281,916. Patented July 24, 1883.

Witnesses:
H. A. Daniels
William E. Poulter

Inventor
Lauritz Badstue Nielsen
by Henry Orth
his atty.

UNITED STATES PATENT OFFICE.

LAURITZ B. NIELSEN, OF CHICAGO, ILLINOIS.

CENTRIFUGAL CREAMER.

SPECIFICATION forming part of Letters Patent No. 281,916, dated July 24, 1883.

Application filed December 18, 1882. (No model.)

*To all whom it may concern:*

Be it known that I, LAURITZ BADSTUE NIELSEN, of Chicago, in the county of Cook and State of Illinois, United States of America, now temporarily residing at Quottrup Minde, in the Kingdom of Denmark, have invented certain new and useful Improvements in Centrifugal Creamers; and I do hereby declare that the following is a full, clear, and exact description of the invention, which will enable others skilled in the art to which it appertains to make and use the same, reference being had to the accompanying drawings, which form a part of this specification.

The invention has for its object to more effectually separate the cream from milk by centrifugal action, substantially as fully described hereinafter.

Figure 1:
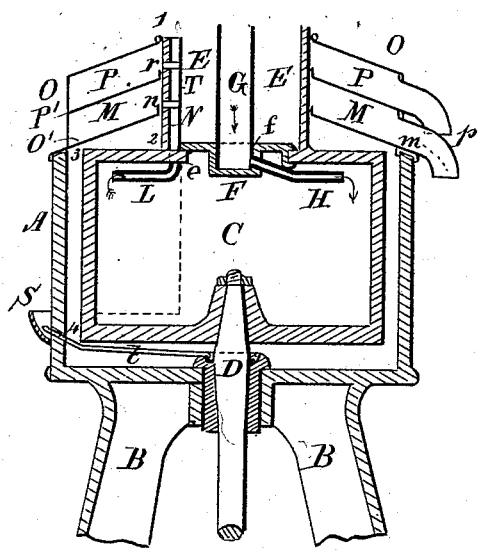
Figure 3:
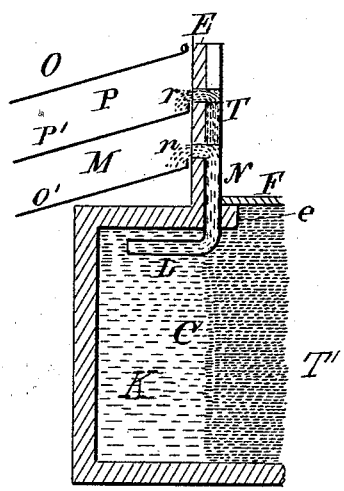
Figure 4:
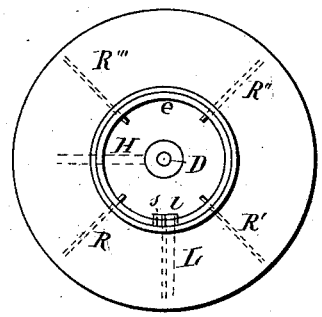
Figure 2:
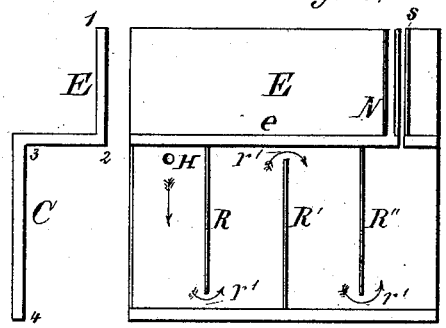
Figure 5:
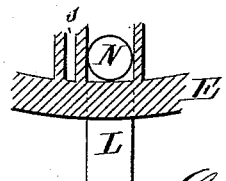

In the accompanying drawings, Figure 1 is a vertical transverse section of the improved centrifugal cream-separator. Fig. 3 is a sectional elevation of a portion thereof on a larger scale. Fig. 2 is a diagram of the centrifugal vessel, showing the arrangement of the discharge-passages for the milk and cream, and the arrangement of the partitions taken on the interrupted line of elevation 1 2 3 4, Fig. 2. Fig. 4 is a plan view of the apparatus, the cover F being removed. Fig. 5 is a horizontal sectional view of part of the vessel E, showing the discharge-passages for the milk and for the cream on an enlarged scale.

In these figures of drawings like letters indicate like parts.

A cylindrical vessel, C, mounted upon and rotated by a vertical spindle, D, in any suitable manner, is inclosed by an outer casing, A, mounted upon or having suitable supporting legs or standards, B. The vessel C has a tubular extension of less diameter, forming a second vessel, E, at the bottom of which is an annular flange, $e$, upon which is fitted a cover, F, having a central cylindrical recess, $f$, in which is fitted the feed-pipe G, that communicates with the interior of the vessel C through a branch or inlet tube, H, secured to the cover F, or to pipe G through said cover. In the flange $e$ of the vessel E, upon one side, are formed two passages, $l$ and $s$, the former communicating, on the one hand, with the interior of the vessel C by a tube, L, extending from the passage at right angles to, or nearly to, the inner periphery of the vessel C, as shown. On the other hand, said passage $l$ communicates, through a vertical passage or tube, N, with the discharge-port $n$, formed in the wall of the vessel E, through which the milk is discharged. The passage $s$ is in direct communication with the interior of the vessel C, and with a vertical tube or passage, T, that communicates with the discharge-port $r$, through which the cream is discharged. A cylindro-conical casing, O, supported at its outer extremity upon the stationary vessel A, and fitted snugly upon the periphery of the part E of the vessel C, is divided into two chambers, M P, by the partition-plate P'. The discharge-port $n$ for the milk communicates with the chamber M and the discharge-port $r$ for the cream with the chamber P, each of said chambers being provided with a discharge-spout, $m\,p$, respectively, through which the milk and cream are discharged, to be collected in suitable receivers.

It will be understood that while the vessel C E rotates the casing O is stationary, and is so fitted to the part E of vessel C as to prevent any milk or cream from running down along the outer periphery of the said part E, between the flanges of the partition-plate P' and the bottom plate, O', of the casing O.

Within the vessel C are arranged two or more partitions, R R' R² R³, extending radially from the inner periphery of the vessel C nearly to the periphery of the flange $e$— that is to say, the width of the vessel C should always be such as to bring their vertical edges on, or approximately on, the line of demarkation of the respective columns of milk and cream—and said partitions extend alternately from the head or top of the vessel C nearly to its bottom, and from the bottom nearly to its top, forming passages $r'$ alternately below and above said partitions, as plainly shown in Fig. 2.

The result of the centrifugal action in cream-separators of this class is well known. As the cream separates from the milk, owing to its less specific gravity, it collects around a center of least motion, as at T', while the greater specific gravity of the milk causes it to be thrown away from the center of motion, and to be collected, therefore, around the periphery of the vessel, as at K, the two forming well-defined strata. As the discharge-pipe for the milk is at or near the point of greatest motion or centrifugal action, the milk will escape or be forced through the passage and discharged into chamber M, while the cream will in a like manner be discharged through the passage s, that is projected sufficiently near the center of least motion to prevent any milk entering the same.

One of the most essential features of this invention consists in the means employed for imparting a combined rotary and undulating motion to the milk, which in separators of this class has, so far as I am aware, not heretofore been obtained. In most of the separators the milk, owing to the centrifugal action, is stationary relatively to the rotating vessel. To overcome this inertia partitions have been placed within the rotating vessel to carry the strata of milk along, and thereby accelerate the separation of the cream therefrom. This result is but imperfectly obtained, however, owing to the uniform motion imparted to the milk, it being simply entrained by the partitions, acquiring the same velocity as the vessel C, and in reality does not produce that agitation or circulation by which a separation of the cream is most speedily and effectually obtained. This agitation or circulation, or, more properly, compound movement of the milk I obtain by arranging the partitions as above described, whereby the milk not only partakes of the rotation of the vessel by being entrained by the partitions, but the centrifugal action upon said milk causes it to circulate in a vertical direction from the bottom to the top of the separator, and vice versa, producing that agitation which is most conducive to the prompt and effectual separation of the two elements.

S is an oil-cup, and t an oil-tube, for lubricating the spindle D, as shown in Fig. 1.

Having now described my invention, what I claim is—

1. In a centrifugal cream-separator, the rotating vessel, having two or more partitions extending radially from the periphery toward the center and vertically toward the bottom and top thereof, forming alternate passages above and below said partitions, substantially as and for the purposes specified.

2. The rotating vessel of a centrifugal cream-separator, having a tubular extension, E, discharge-passages l s, discharge-pipes L T, and partitions extending radially from the periphery of the vessel toward the center and vertically toward the bottom and top thereof, substantially as described.

3. In a centrifugal cream-separator, the combination, with the rotating vessel having partitions extending from the periphery toward the center, and alternately from the bottom and top of such vessel, a tubular extension provided with discharge-passages for the milk and cream, and a diaphragm interposed between said extension and the rotating vessel, of a milk-reservoir located within said extension, and a feed-pipe connected with the reservoir and rotating vessel through the dividing-diaphragm, substantially as and for the purposes specified.

In testimony that I, LAURITZ BADSTUE NIELSEN, claim the foregoing as my own invention I have hereunto affixed my signature in the presence of two witnesses.

LAURITZ BADSTUE NIELSEN.

Witnesses:
H. SOMMER,
A. STUNBERG.